United States Patent
Oesch et al.

(10) Patent No.: US 7,085,309 B2
(45) Date of Patent: Aug. 1, 2006

(54) RADIOFREQUENCY SIGNAL RECEIVER WITH MEANS FOR CORRECTING THE EFFECTS OF MULTIPATH SIGNALS, AND METHOD FOR ACTIVATING THE RECEIVER

(75) Inventors: Yves Oesch, Neuchâtel (CH); Anne Monthéard, Eclépens (CH); Pierre-André Farine, Neuchâtel (CH)

(73) Assignee: Asulab S.A., Marin (CH)

( * ) Notice: Subject to any disclaimer, the term of this patent is extended or adjusted under 35 U.S.C. 154(b) by 639 days.

(21) Appl. No.: 10/162,938

(22) Filed: Jun. 4, 2002

(65) Prior Publication Data
US 2002/0186794 A1 Dec. 12, 2002

(30) Foreign Application Priority Data
Jun. 8, 2001 (CH) .................................. 1040/01

(51) Int. Cl.
    H04B 1/707 (2006.01)
(52) U.S. Cl. .................. 375/142; 375/316; 342/91; 342/450; 342/465
(58) Field of Classification Search ............... 375/130, 375/136, 142, 145, 147, 149, 150, 152, 316, 375/320; 342/89–91, 450, 464, 465
    See application file for complete search history.

(56) References Cited

U.S. PATENT DOCUMENTS

| | | | | |
|---|---|---|---|---|
| 5,495,499 A | * | 2/1996 | Fenton et al. | ............... 370/479 |
| 5,600,670 A | * | 2/1997 | Turney | ........................ 375/150 |
| 5,966,403 A | | 10/1999 | Pon | |

2001/0002458 A1 5/2001 Kohli

FOREIGN PATENT DOCUMENTS

| EP | 0 552 975 | | 7/1993 |
|---|---|---|---|
| WO | WO 95/14937 A1 | | 6/1995 |
| WO | WO 97/40398 | | 10/1997 |
| WO | WO 9740398 A2 | * | 10/1997 |

* cited by examiner

*Primary Examiner*—Kevin Burd
*Assistant Examiner*—Freshteh Aghdam
(74) *Attorney, Agent, or Firm*—Sughrue Mion, PLLC

(57) ABSTRACT

The receiver (1) for radio-frequency signals (SV1, SV2, SV3, SV4), modulated by specific codes of transmitting sources, such as satellites (S1, S2, S3, 54), includes receiving and shaping means with frequency conversion for the radio-frequency signals for generating intermediate signals, a correlation stage formed of several correlation channels for receiving the intermediate signals and microprocessor means connected to the correlation stage in order to process the extracted data after correlation. Each channel includes a correlator in which the intermediate signals are correlated with at least two early and late replicas of the specific code of a visible transmitting source to be searched and tracked. The correlator further includes integrator counters for the correlated signals to provide a first amplitude value of the auto-correlation function of the early signals and a second amplitude value for the late signals. When multipath signals (SV1', SV3') are detected in the first operating channel, at least a second unused channel is configured, via the microprocessor means, and connected in parallel to the first channel. The second channel has the task of searching the maximum amplitude value between the two amplitude values of the first operating channel. The receiver, in particular of the GPS type, can be mounted in the case of a watch and powered by the energy accumulator or battery of the watch.

19 Claims, 7 Drawing Sheets

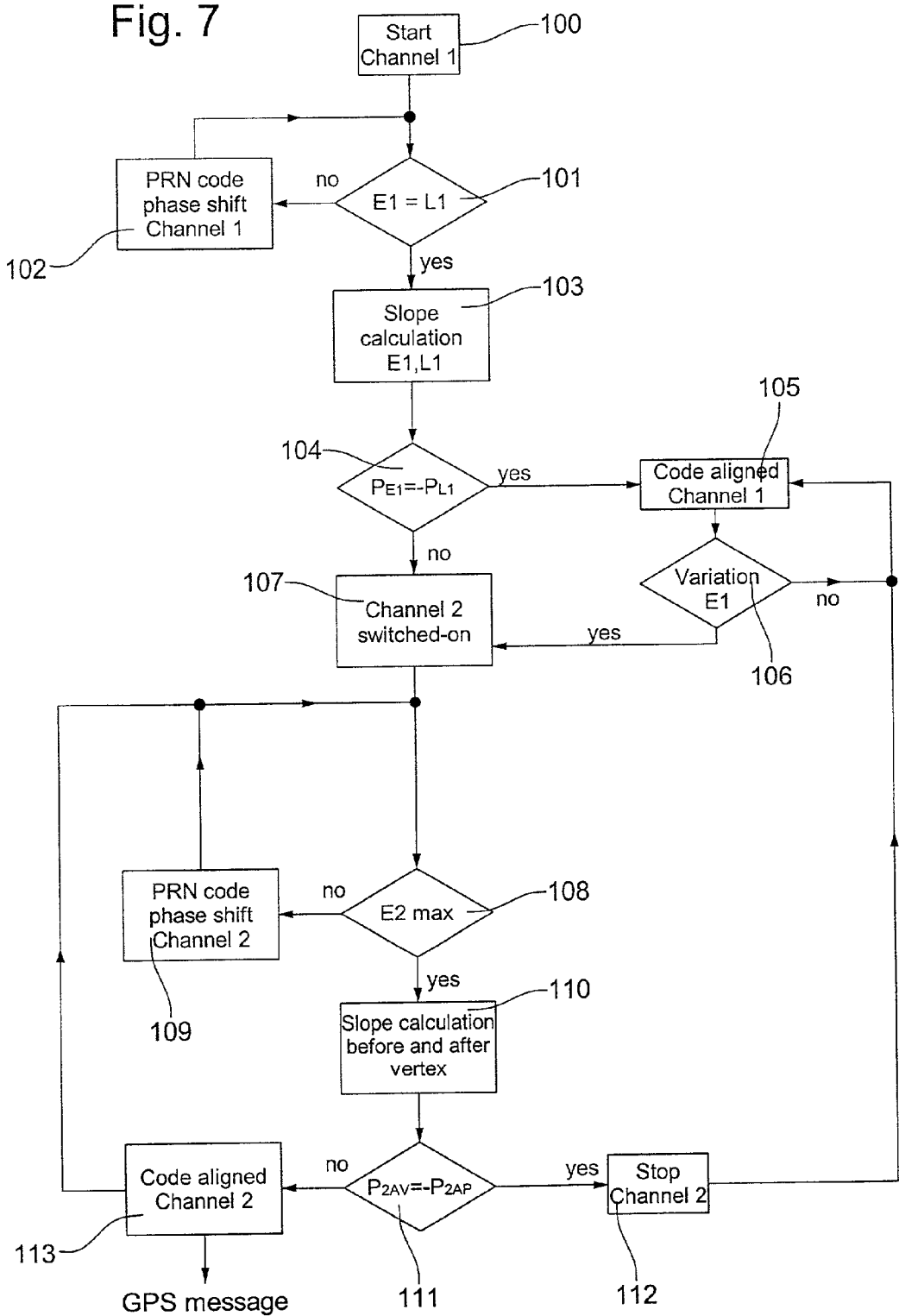

RADIOFREQUENCY SIGNAL RECEIVER WITH MEANS FOR CORRECTING THE EFFECTS OF MULTIPATH SIGNALS, AND METHOD FOR ACTIVATING THE RECEIVER

BACKGROUND OF THE INVENTION

The invention concerns a receiver for radio-frequency signals, in particular of the GPS type, having means for correcting the effects of multipath signals. The invention also concerns a method for activating or setting the receiver into operation.

The receiver for radio-frequency signals modulated by specific codes of transmitting sources includes receiving and shaping means. These means allow frequency conversion of the radio-frequency signals to provide intermediate signals.

The receiver also includes a correlation stage formed of several correlation channels which receive the intermediate signals. Each channel is provided with a correlator in which the intermediate signals are correlated. This correlation is achieved by means of at least one control loop of the correlator, when the channel is being used, with at least two replicas of the specific code of a visible transmitting source to be searched and tracked, which are in phase early and late. The correlator includes means for integrating the correlated signals to provide, at the end of each integration period, a first amplitude value of the auto-correlation function of the early signals and a second amplitude value of the auto-correlation function of the late signals. In a transmitting source tracking mode, the first and second amplitude values are kept substantially equal.

The receiver also includes microprocessor means connected to the correlation stage for processing the data extracted from the radio-frequency signals after correlation.

If said receiver is a GPS receiver, the data extracted from the radio-frequency signals is, in particular, the GPS message, the pseudo-ranges and the Doppler frequency, this data being used to calculate the position, velocity and time (hour).

The radio-frequency signal receiver of the present invention can of course also be used in a satellite navigation system of the GLONASS or GALILEO type. Likewise, the receiver could be used in a mobile telephone network, for example of the CDMA type (Code-division multiple access). In such case, the transmitting sources are no longer satellites but base cells of the telephone network, and the processed data concerns audible or legible messages, or navigation messages.

Currently, 24 satellites are placed in orbit at a distance close to 20,200 km above the surface of the Earth on 6 orbital planes each offset by 55° with respect to the equator. The time taken by a satellite to make a complete revolution in orbit before returning to the same point above the Earth is approximately 12 hours. The distribution of the satellites in orbit allows a terrestrial GPS receiver to receive GPS signals from at least four visible satellites to determine its position, velocity and the local time.

In civil applications, each of the satellites in orbit transmits radio-frequency signals formed of a carrier frequency L1 at 1.57542 GHz on which are modulated a pseudo-random PRN code at 1.023 MHz peculiar to each satellite and a GPS message at 50 Hz. The GPS message contains the ephemerides and almanac data of the transmitting satellite, which are useful in particular for calculating the X, Y, Z position, velocity and time related data.

The PRN code (pseudo random noise), in particular of the Gold code type, is different for each satellite. This Gold code is a digital signal formed of 1023 chips which are repeated every millisecond. This repetition period is also defined by the term "epoch" of the Gold code. It is to be noted that a chip takes the values 1 or 0 as for a bit. However, a chip (the term used in GPS technology) is to be differentiated from a bit which is used to define a unit of data.

The Gold codes defined for 32 satellite identification numbers have the characteristic of being orthogonal. By correlating them with each other the correlation result gives a value close to 0. This characteristic thus enables several radio frequency signals transmitted on a same frequency originating from several satellites simultaneously to be independently processed in several channels of the same GPS receiver.

Currently, in several daily activities, GPS receivers, which are portable or incorporated particularly in vehicles, are used to allow navigation data to be provided to users. This data facilitates, in particular, orientation, the search for a target and knowledge of bearings. Moreover, portable GPS receivers tend to be of smaller size so as to enable them also to be incorporated in objects, which can easily be transported by one person, such as in cellular telephones or in wristwatches. However, as they are powered by a battery or accumulator of small size, it is often necessary to minimise the energy consumed by the receivers.

It should be noted that a GPS receiver needs to pick up the radio-frequency signals transmitted by at least four visible satellites in order to determine in particular its position and time related data. The receiver can also pick up the ephemerides data and almanac data peculiar to each satellite by locking on individually to one of the visible satellites.

FIG. 1 shows schematically GPS receiver 1, provided with an antenna 2 for picking up radio-frequency signals. Said GPS receiver 1 has to receive signals SV1 to SV4 originating from at least four visible satellites S1 to S4 in order to be able to determine its position, velocity and time-related data. However, when said receiver 1 is used in locations surrounded by various obstacles, such as buildings B in towns, certain radio-frequency signals SV1' and SV3' picked up by receiver 1 are sometimes reflected across these obstacles B. These signals SV1' and SV3' reflected and combined with the direct signals SV1 and SV3 which originate from the same transmitting source can cause errors as to the data extracted from the set of signals picked up by the receiver. These errors have, in particular, repercussions on the calculation of the receiver's position.

Phase errors due to multipath signals can be greater than or equal to 150 ns for terrestrial navigation receivers, which corresponds to an error of 45 m on the calculated position. Generally, nominal errors are within a margin of 30 ns, which corresponds to an error of approximately 9 m on a calculated position. These errors are usually difficult to remove completely, even though this phenomenon of multipath signals is well known. Several embodiments have already been proposed to minimise the effect of such multipath signals.

One may cite, in particular, Patent Application No. WO 95/14937 of the Novatel company, which discloses a pseudo-random noise encoded radio-frequency signal receiver provided with means for compensating distortions due to multipath signals. In order to do this, the receiver includes several correlation channels, which are each intended to acquire a specific satellite at the same time. Auto-correlation means for each channel include several correlators, which each receive an internally generated pseudo-random code replica phase shifted with respect to another replica to be correlated with intermediate signals. An output signal power level estimator for each correlator of a channel is provided to eliminate the effects of the multipath signals. The phase shift between each replica is for example less than 0.2 chips which requires a high establishment frequency for each replica.

A major drawback of this receiver is that each channel is provided with a multitude of correlators for the acquisition and tracking phases of a specific visible satellite. Consequently, the very high number of elements needed to form the correlation stage of the channels leads to high energy consumption, which does not allow the receiver to be integrated in a portable object including a low capacity energy source.

In a same technical context, U.S. Pat. No. 5,966,403 of Trimble Navigation Limited discloses a spread spectrum radio-frequency receiver which also includes means for minimising the effects of multipath signals. This document proposes two alternative embodiments. In the first variant, a uniform or non-uniform signal weighting function is used for correlating the intermediate signals with early and late replicas. The microprocessor means receive several correlated and weighted signals, and close the carrier and code control loops. These microprocessor means have the task of estimating the signal distortion due to multipath signals and of minimising such distortion.

In a second variant, two correlation channels of the receiver are used in parallel for tracking the same satellite whose transmitted signals are capable of being diverted from their trajectory. The second channel is used to allow the microprocessor means to minimise distortion due to multipath signals. A phase delay is imposed for generating the early and late replicas of each channel in order for the microprocessor means to be able to evaluate the distortion due to multipath signals.

SUMMARY OF THE INVENTION

As for the preceding document, one drawback of these embodiments essentially lies in the complexity of the structure of each channel for minimising the effects of multipath signals. Moreover, microprocessor means of large dimensions are used for all the synchronisation tasks. This complexity also leads to high energy consumption, which prevents such a receiver being integrated in a portable object of small size provided with a low capacity energy source.

One object of the present invention consists in providing a radio-frequency signal receiver capable of correcting the effects of multipath signals while limiting the necessary number of elements for the receiver and reducing its power consumption in order to overcome the drawbacks of the receivers of the prior art. The receiver can thus be fitted to portable objects of small size.

Another object of the present invention consists in using unused channels of the receiver which have the same structure as the channels being used to allow the effects of multipath signals to be corrected.

This object, in addition to others, is achieved by the aforecited receiver which is characterised in that at least a second unused channel is configured via the microprocessor means to be placed in parallel to at least a first operating channel for searching and/or tracking the same visible transmitting source, when the microprocessor means have detected the presence of multipath signals in the first operating channel, the microprocessor means enslaving the second channel to generate a replica of the specific code to be correlated with the intermediate signals so that the integration means of the second channel provide a maximum amplitude value for the auto-correlation function between the first and second amplitude values of the auto-correlation function of the first channel.

One advantage of the receiver of the present invention is that, by using identical channels, which each include the same number of elements, and in cooperation with the microprocessor means, it enables the problem of errors of calculation due to the effects of multipath radio-frequency signals to be avoided. When the receiver is operating, not all of the correlation channels are used, since the number of visible transmitting sources, in particular visible satellites, is less than the number of correlation channels in the receiver. This means that a certain number of channels remain unused. Consequently, these channels defined as being unused, can very well be connected in parallel to the operating channels to allow the microprocessor means to correct the errors due to multipath signals.

It should be noted that at least four correlation channels each used in a tracking mode of a specific visible satellite, are necessary for the microprocessor means to be able to calculate position, velocity and time-related data. Thus, one may provide only one unused channel placed in parallel to a operating channel in the event that multipath signals are detected in one of the operating channels.

Said receiver has to be able to be integrated in an easily transportable object including a low capacity energy source, which imposes a reduction on the number of elements in each correlation channel. Moreover, management of all the synchronisation tasks must be able to be achieved in a simplified manner, in particular in each operating channel independently of the microprocessor means. It is normally only after having detected the presence of multipath signals in an operating channel, that the microprocessor means assist an unused channel in searching for the maximum amplitude for the auto-correlation function. Thus, there is little data transfer between said microprocessor means and the operating channels which reduces the receiver's energy consumption.

Another advantage of the receiver of the present invention is that parameters of the first channel normally used are transferred to the second channel to be connected in parallel to the first channel via microprocessor means. Consequently, the second channel can operate more quickly to find, in co-operation with the microprocessor means, the maximum amplitude of the auto-correlation function. The first channel still remains used even if the second channel is connected for reasons of stability, since it is possible that the multipath signals may disappear. In such case, the second channel is stopped and the first channel provides the data to the microprocessor means, in particular for the calculating operations of the position, velocity and time-related data of a GPS receiver.

The phase shift between the maximum auto-correlation function amplitude value given by the second channel and the first auto-correlation function amplitude value of the early signals of the first channel can be stored. This phase shift can thus be introduced as an additional parameter of a second unused channel for a future parallel connection of a first operating channel.

Normally, the microprocessor means include storage means in which is stored the data concerning the position of the satellites, their specific code, and the satellites which are capable of being visible to the terrestrial receiver at the moment that it is activated. The receiver is thus able to establish which satellites are visible at the moment of setting the selected correlation channels in operation.

This object, in addition to others is also achieved owing to the method for correcting the effects of multipath signals of a receiver, which includes a first series of steps consisting in:

configuring and switching on a certain number of first channels so that each channel searches and tracks a specific transmitting source, phase shifting the early and late replicas of the specific code of each first operating channel to be correlated with the intermediate signals until the first and second amplitude values for the auto-correlation function are equal, storing correlation amplitude values for the early signals and late signals, and for corresponding phase shifts, during the search and/or tracking phase, said method being characterised in that it further includes a second series of steps of:

calculating, using the auto-correlation function amplitude values and corresponding stored phase shifts in search and/or tracking phase for each first operating channel, a first slope of the auto-correlation function at the point of the first amplitude value of the early signals and second slope for the auto-correlation function at the point of the second amplitude value of the late signals, when the channel is in the transmitting source tracking mode, configuring and switching on at least a second unused channel to be placed in parallel to a first operating channel, if the two slopes calculated, in absolute value, are substantially different, or if a variation is observed in the first amplitude value of the early signals or in the second amplitude value of the late signals in a tracking mode, phase shifting one of the code replicas of the second channel under an instruction from the microprocessor means until the integration means of the second channel supply a maximum amplitude value of the auto-correlation function between the first and second amplitude values of the auto-correlation function of the first channel so that the microprocessor means can extract the data from the radiofrequency signals of this second channel while correcting the effects of multipath signals.

BRIEF DESCRIPTION OF THE DERAWING

The objects, advantages and features of the radio-frequency signal receiver and the method for activating said receiver, will appear more clearly in the following description of embodiments illustrated by the drawings, in which:

FIG. 1, which has already been cited, shows a GPS type radio-frequency signal receiver picking up signals from at least four satellites wherein the signals from two satellites are diverted from their trajectory by obstacles;

FIG. 2 shows schematically the various parts of the radio-frequency signal receiver according to the invention, FIG. 3 shows schematically the elements of a correlator of one channel of the correlation stage of the receiver according to the invention, FIGS. 4a and 4b show respectively a graph of an auto-correlation function, and an intermediate signal to be correlated with phase-shifted replicas to define the auto-correlation function;

Figure 6A:
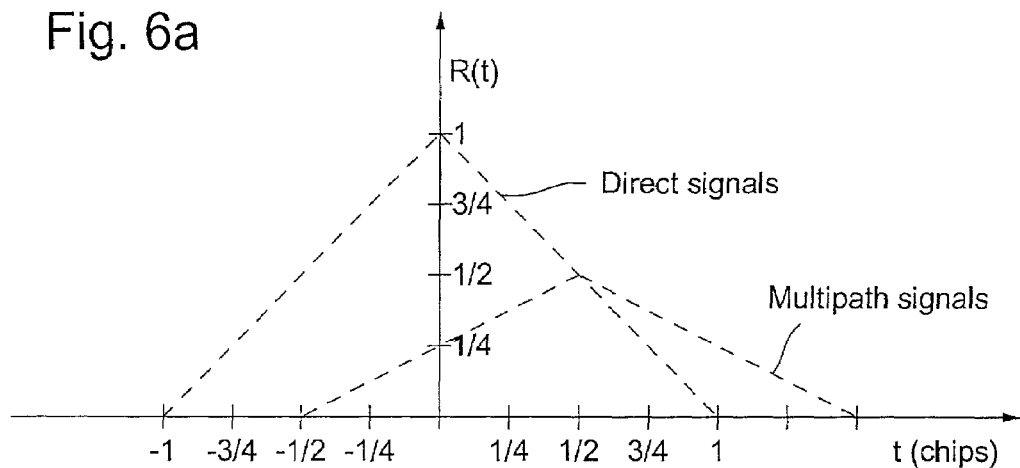
Figure 6B:
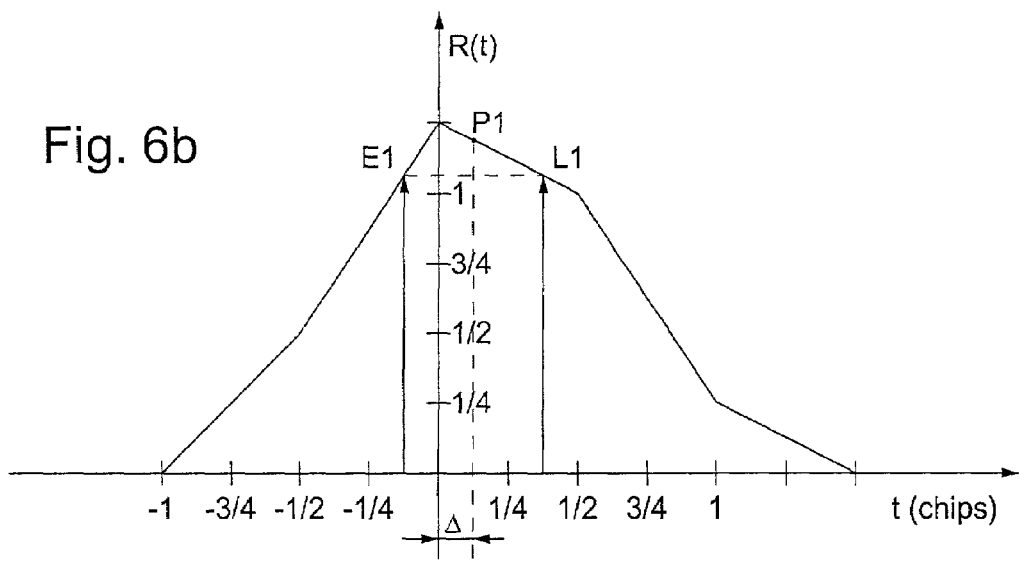
Figure 6C:
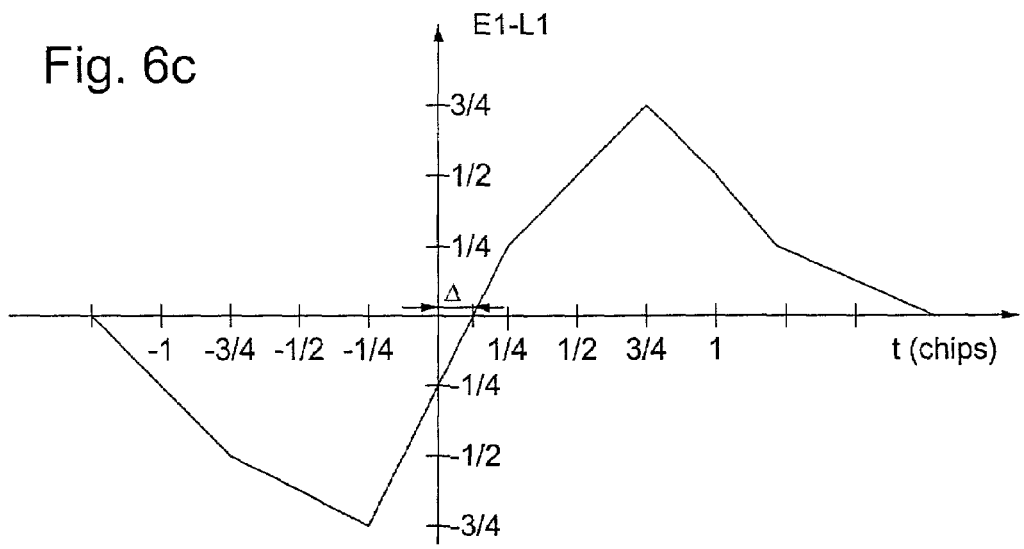

FIGS. 6a and 6b show graphs of the auto-correlation function in the case of multipath signals where the amplitude of the signals correlated with the early replica is equal to the amplitude of the signals correlated with the late replica in a tracking phase, but with a phase shift with respect to signals without multipaths, FIG. 6c shows a graph of the correlation function obtained by subtracting the early component and the late component in the case of multipath signals; and FIG. 7 shows a flow diagram of the steps of the method for activating the receiver whether multipath signals are detected or not.

DETAILED DESCRIPTION OF THE INVENTION

In the following description, several elements of the radio-frequency signal receiver, particularly of the GPS type, which are well known to those skilled in the art in this technical field, are mentioned only in a simplified manner. The receiver described hereinafter is preferably a GPS receiver. It could nonetheless be used in a GLONASS or GALILEO navigation system or any other navigation system, or in a mobile telephone network.

Figure 1:
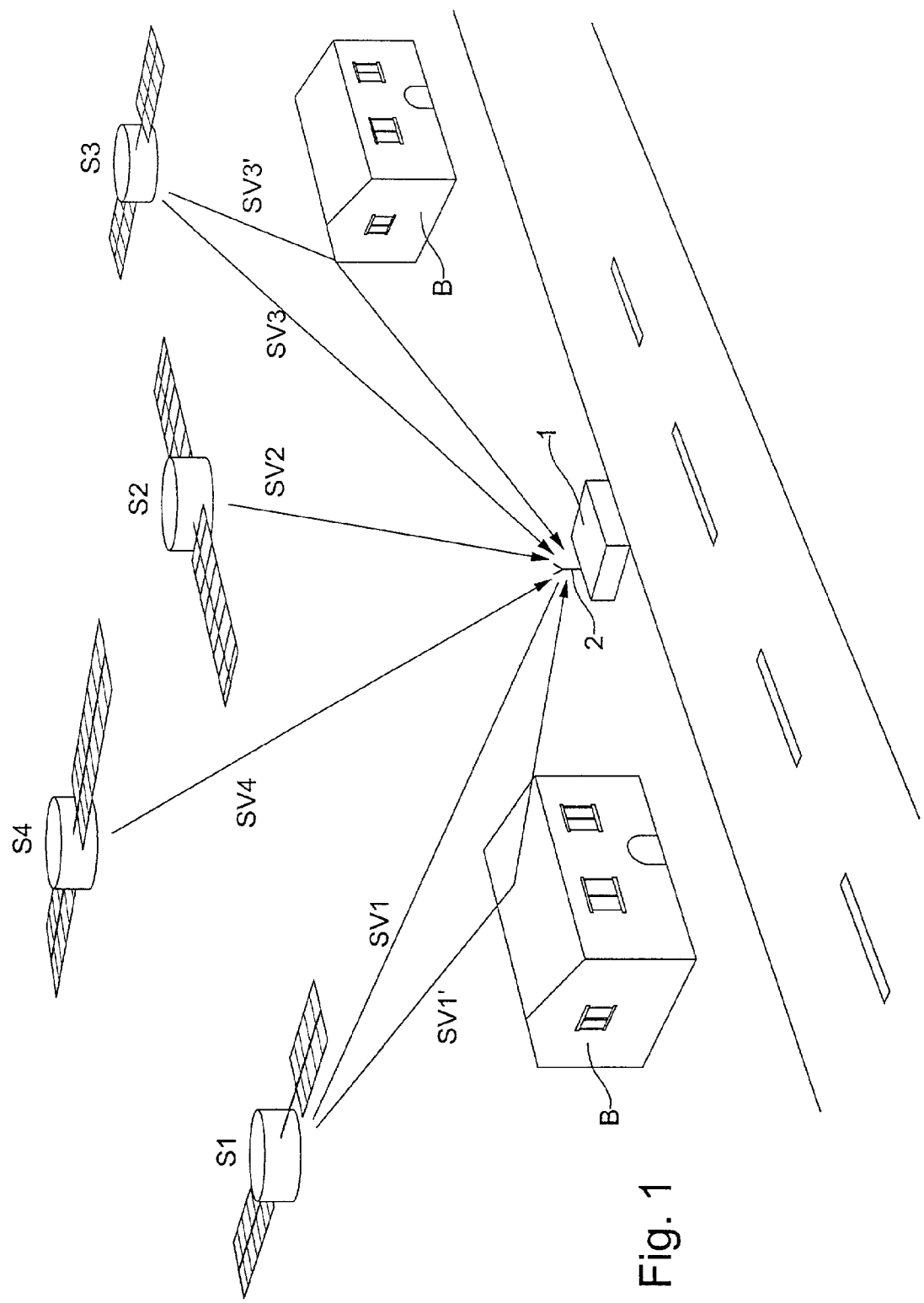

As shown in FIG. 1, radio-frequency signals SV1 to SV4 picked up by an antenna 2 of a GPS receiver are transmitted by four visible satellites S1 to S4. Signals SV1 to SV4 of these four satellites are necessary for said GPS receiver 1 to be able to extract all the information useful for the calculation of its position, velocity and/or time-related data. However, on their path, certain radio-frequency signals SV1' and SV3' may be reflected by various obstacles, such as buildings B. These diverted signals SV1' and SV3' may disrupt detection of direct signals SV1 and SV3 picked up the receiver. The correlation channels in the search and tracking phase of satellites S1 and S3 are thus subjected to the effect of multipath signals which causes a position calculation error. As will be explained in the following description, at least one channel defined as being unused is placed in parallel to each operating channel tracking satellites S1 and S3 to correct the effects of multipath signals.

The GPS receiver can preferably be fitted to a portable object, such as a wristwatch, in order to provide position, velocity and local time data as required to the person wearing the watch. As the watch has an accumulator or battery of small size, the power consumed must be as little as possible during operation of the GPS receiver.

Of course, the GPS receiver could be fitted to other portable objects of small size, such as portable telephones, which are fitted with an accumulator or battery of small size.

Figure 2:
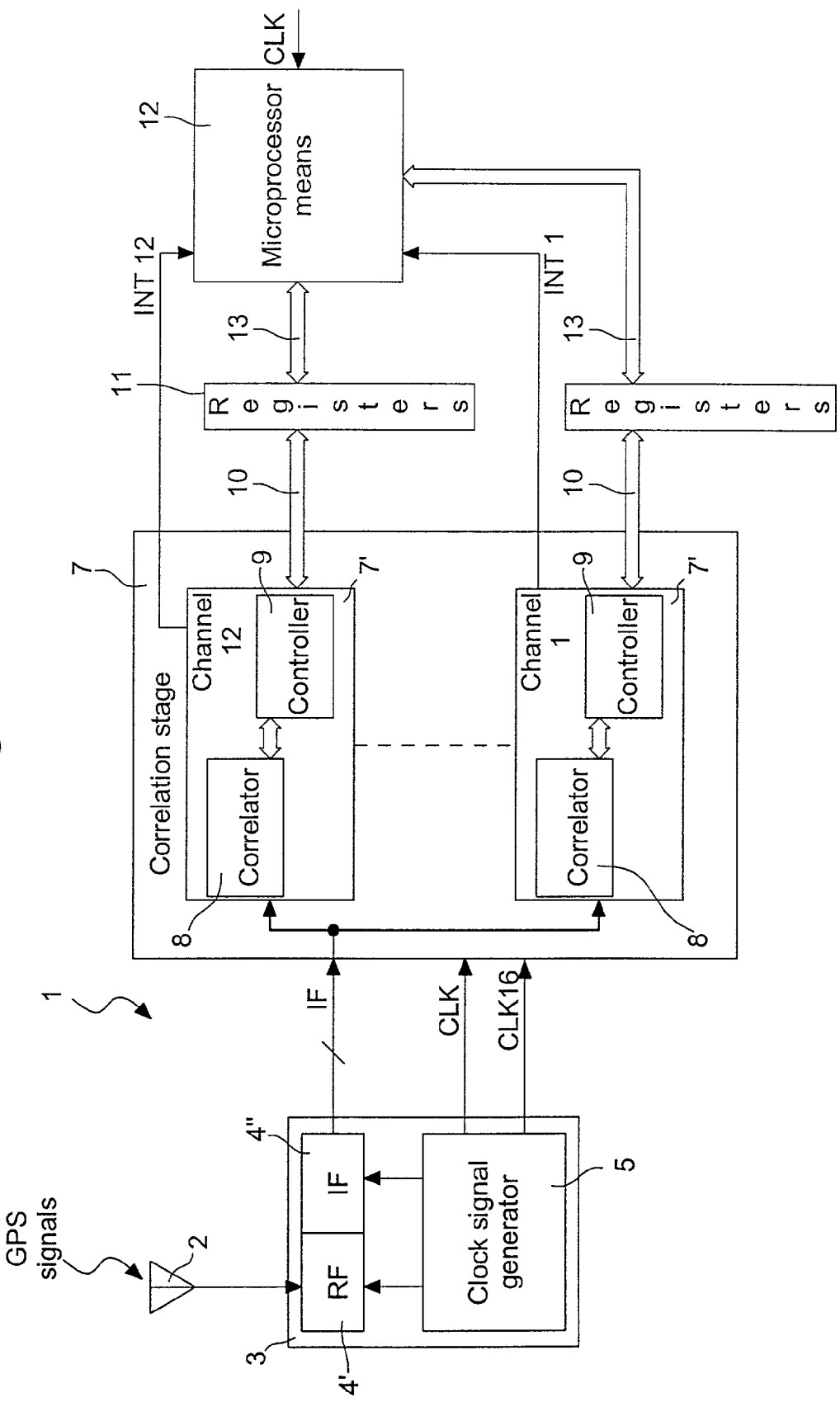

GPS receiver 1 is shown schematically in FIG. 2. It includes receiving and shaping means with frequency conversion of radio-frequency signals 3 provided by an antenna 2 to generate intermediate signals IF, a correlation stage 7 formed of 12 channels 7' for receiving intermediate signals IF, a data transfer bus 10 connecting each channel to a respective buffer register 11, and finally a data bus 13 connecting each buffer register to microprocessor means 12.

Intermediate signals IF are preferably, in a complex form, formed of a component of in-phase signals I and a component of quarter-phase signals Q at a frequency of the order of 400 kHz provided by shaping means 3. The complex intermediate signals IF are represented in FIG. 2 by a bold line intersected by an oblique line defining 2 bits.

The number of channels 7' available in receiver 1 must be higher than the maximum number of visible satellites at any point on the Earth so that a certain number of unused channels remains. These unused channels are intended to be connected in parallel with operating channels in the case that the microprocessor means have detected the presence of multipath signals in the normally operating channels. The influence of the multipath signals, and the connection of the unused channels will be explained hereinafter with particular reference to FIGS. 3 to 6.

Conventionally, in receiving means 3, a first electronic circuit 4' converts first of all the radio-frequency signals of frequency 1.57542 GHz into a frequency for example of 179 MHz. A second electronic circuit IF 4" then performs a double conversion to bring the GPS signals first of all to a frequency of 4.76 MHz then finally to a frequency for example of 400 kHz by sampling at 4.36 MHz. Intermediate complex signals IF sampled and quantified at a frequency of the order of 400 kHz are thus provided to channels 7' of correlation stage 7.

For the frequency conversion operations, a clock signal generator 5 forms part of the radio-frequency signal receiving and shaping means 3. This generator is for example provided with a quartz oscillator, which is not shown, calibrated at a frequency of the order of 17.6 MHz. Two clock signals CLK and CLK16 are provided in particular to correlation stage 7 and to microprocessor means 12 to clock all the operations of these elements. The first clock frequency CLK may have a value of 4.36 MHz, while the second clock frequency may be fixed at 16 times less, i.e. at 272.5 kHz used for a large part of the correlation stage in order to save on energy consumption.

It is to be noted that one may envisage obtaining clock signal CLK16 using a divider placed in the correlation stage instead of being integrated with clock signal generator 5 in receiving means 3.

The signals supplied by the second circuit 4" in half of the cases give signals of different parity (+1 and −1). Account must thus be taken of this parity for the demodulation operations of the GPS signals in the receiver. In an alternative embodiment, the second circuit 4" can give signals (+3; +1; −1; −3) distributed over 2 output bits for the in-phase component as well as for the quarter-phase component.

In the case of the GPS receiver of the present invention, intermediate signals IF with 1-bit of quantification for the carrier frequency are provided to the correlation stage, even if this quantification generates an additional loss of the order of 3 dB on the signal noise ratio (SNR).

Registers 11 of each channel are capable of receiving configuration data or parameters originating from the microprocessor means. Each channel is capable of transmitting, via the registers, data concerning the GPS messages, the state of the PRN code, the frequency increment relating to the Doppler effect, the pseudo-ranges, correlation amplitude values with phase shifts and other data after correlation and locking onto a specific satellite.

Buffer registers 11 are formed of several sorts of registers which are for example command and status registers, registers for NCO (Numerically Controlled Oscillator) oscillators of the channels, pseudo-range registers, energy registers, offset registers and increment registers of the carrier and of the code and test registers. It is to be noted that these registers can accumulate data during the correlation phase in order to be used during the acquisition and tracking of satellites without necessarily being automatically transferred to the microprocessor.

In an alternative embodiment, a single block of registers 11 can be envisaged for all the channels 7' of the correlation stage, given that certain data placed in the register unit is common to each channel.

Each channel 7' of correlation stage 7 includes a correlator 8 and a controller 9 intended to set into operation, via a dedicated material, in particular the signal processing algorithm for acquiring the satellite signal and tracking the satellite detected by the channel.

Controller 9 of each channel includes, amongst other things, a memory unit, an arithmetical unit, a data bit synchronisation unit, a correlator control unit and an interruption unit, which are not visible in FIG. 1. The memory unit is formed in particular of a RAM memory for storing momentary data. The RAM memory is distributed in a non-regular or regular structure. The arithmetical unit performs in particular addition, subtraction, multiplication, accumulation and shift operations.

In normal operation, all the acquisition and tracking operations for the detected satellites are thus achieved autonomously in each respective channel of the correlation stage. These tasks are carried out in a bit-parallel architecture where the calculation of several bits is achieved in one clock pulse. The digital signals are at 1 kHz, which allows autonomous processing of said signals of the carrier frequency and PRN code control loops at a less significant frequency rate. When a channel has locked onto a satellite, the circuit synchronises the flow of GPS data intended for subsequent calculations.

Thus, the transfer of data with microprocessor means 12 no longer occurs during all the correlation steps. It is only the result of the correlation of each channel 7' of correlation stage 7 which is transferred to the microprocessor, in particular the GPS messages at a frequency of 50 Hz. This results in a great reduction in current consumption. However, when the microprocessor means have to connect an unused channel in parallel to a normally operating channel to correct the effects of multipath signals, the synchronisation operations of this unused channel are performed via said microprocessor means. But several parameters of the operating channel are transferred to configure the unused channel quickly via the microprocessor means without doing any great harm to the power consumption of said receiver.

Consequently, microprocessor means 12 preferably include an 8-bit CoolRISC-816 microprocessor by EM Microelectronic-Marin, Switzerland. This microprocessor is clocked by a clock signal at 4.36 MHz. Microprocessor means 12 also include memory means which are not shown, in which all the information concerning the position of said satellites, their Gold code, and those which are capable of being picked up by the terrestrial GPS receiver are stored.

During all of the satellite search and tracking procedures, the operating channels 7' transmit interruption signals INT1 to INT 12 to the microprocessor to alert it to data that it can extract. As soon as it receives interruption signals, the microprocessor generally has to run through all the channels to find out from which channel the data to be extracted originates. This data can concern for example configuration parameters, GPS messages, the state of the PRN code, the frequency increment due to the Doppler effect, pseudo-distances, modes for interrupting the receiving means, the state of integrator counters and other information.

Since several interruption signals INT 1 to INT 12 can occur at the same time, microprocessor means 12 can also include a priority decoder for operating channels 7'. Thus, the microprocessor can directly access a priority channel transmitting an interruption signal in accordance with a determined order of priority.

In another embodiment, which is not shown, the priority decoder could also be integrated in the correlation stage.

A single semiconductor substrate can contain both the whole of the correlation stage with the registers, priority decoder, microprocessor and also possibly a part of the clock signal generator.

When receiver 1 is set in operation, several channels 7' of correlation stage 7 are configured by microprocessor means 12. The configuration of each channel consists in further introducing therein different parameters relative to the carrier frequency and the PRN code of a specific satellite to be searched and tracked. In a normal operating mode, each channel is configured differently for searching and tracking its own satellite. Since the operating channels can only lock onto visible satellites, several unused channels remain.

Figure 3:
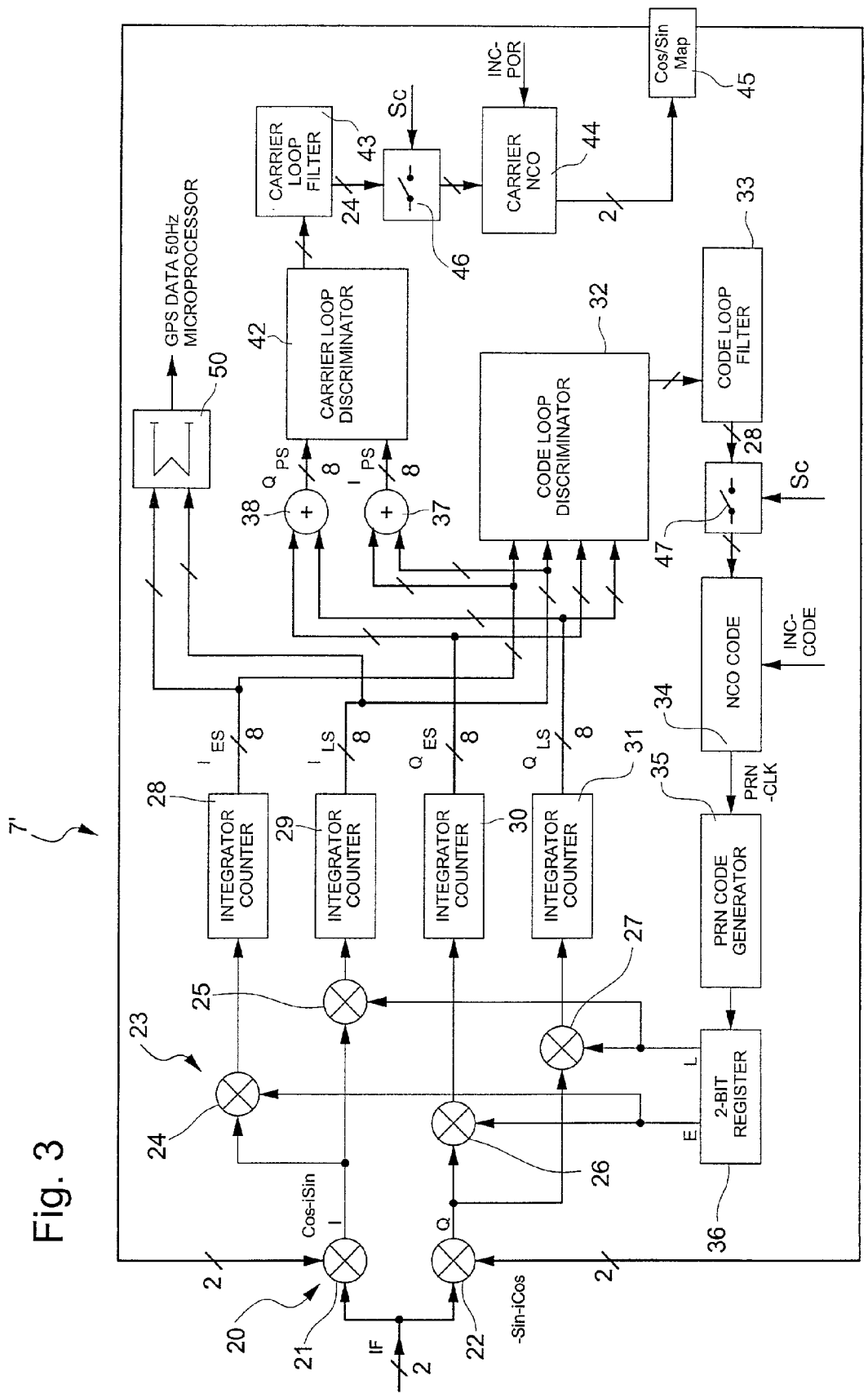

FIG. 3 shows correlator 8 with a part for the PRN code control loop and another part for the carrier frequency control loop. Correlator 8 is identical in each channel 7' of correlation stage 7, but can be configured differently in each channel. As explained with reference to FIG. 2, in normal operation, each channel performs all the synchronisation tasks to search and track a specific visible satellite independently of the microprocessor means. This simplifies manufacture of said receiver and allows the power consumption thereof to be reduced.

For more details relating to the various elements of this correlator, the reader may refer to the teaching drawn from the book "Understanding GPS Principles and Applications" at chapter 5 by Phillip Ward and edited by Elliott D. Kaplan (Artech House Publishers, USA 1996) edition number ISBN 0-89006-793-7, and in particular in FIGS. 5.8 and 5.13.

With reference to FIG. 3, intermediate signals IF, represented in the Figure by a bold line intersected by an oblique line defining 2 bits, are complex signals (I+iQ) formed of a 1-bit in-phase signal component and a 1-bit quarter-phase signal component Q. Said intermediate signals IF have been sampled and quantified, and are passed first of all through first mixers 20 of the carrier. A mixer or multiplier 21 multiplies signals IF by the cosine minus i times the sine of the internally generated carrier replica in order to extract the in-phase signal I from the complex signals, whereas a mixer or multiplier 22 multiplies the signals IF by the minus sine minus i times the cosine of the internally generated carrier replica in order to extract the quarter-phase signal Q from the complex signals.

These Sin and Cos signals originate from a block 45 of a COS/SIN table of the replica signal. The purpose of this first step in first mixers 20 is to extract the carrier frequency from the signals bearing the GPS message.

After this operation, the equivalence of the PRN code of the signals from a satellite to be acquired has to be found, in an operating or switched-on channel with a PRN code generated in said channel corresponding to the desired satellite. In order to do this, the in-phase and quarter-phase signals pass through second mixers 23 to correlate signals I and Q with an early replica and a late replica of the PRN code to obtain four correlated signals. In each channel of the correlation stage, only the early and late replica are kept without taking account of the punctual replica. This enables the number of correlation elements to be minimised. However, by removing the punctual component from the code control loop, a loss in signal noise ratio of the order of 2.5 dB is observed.

The mixer or multiplier 24 receives signal I and early replica signal E from a 2 bit register 36 and supplies correlated early in-phase signals. Mixer or multiplier 25 receives signal I and late replica signal L from register 36 and supplies correlated late in-phase signals. Mixer or multiplier 26 receives the quarter-phase signal Q and early signal E and supplies correlated early quarter-phase signals. Finally, mixer or multiplier 27 receives signal Q and late replica signal L, and supplies late quarter-phase signals. The shift or offset between early replica E and late replica L is a half chip in the embodiment of the present invention, which means that the shift with a central punctual component P would be a ¼ chip. The multipliers can be made for simplicity using XOR logic gates for example.

The four correlated signals each enter integration means formed by integrator counters 28, 29, 30, 31 which are pre-detection elements. These integrator counters supply, at the end of each integration period, binary output words $I_{ES}$, $I_{LS}$, $Q_{ES}$ and $Q_{LS}$, which are represented over 10 bits. These binary words define amplitude values of an auto-correlation function shown particularly in FIG. 4a. The amplitude values are usually standardised to the amplitude value of the correlated signals. Several amplitude values, and the phase shifts, concerning the early correlated and the late correlated signals are stored in storage means in a satellite search mode in order to be used by the microprocessor means for calculating the slopes at the point of the auto-correlation function amplitude values of the early and late correlated signals. On the basis of the calculation of the slopes, the microprocessor means can detect whether the operating channel is subject to the effects of multipath signals.

The integrator counters are defined to be able to count up to a number 1023, which is equal to the number of chips of the PRN code. Each integrator counter 28, 29, 30, 31 of a channel selected by the microprocessor means at the beginning of a search is configured to provide a complete set of binary words $I_{ES}$, $I_{LS}$, $Q_{ES}$ and $Q_{LS}$ every millisecond.

All of the operations in the loops which follow these integrators occur in a bit-parallel architecture with signals at a frequency of 1 kHz. In order to eliminate part of the noise of the useful signal to be demodulated, only the 8 most-significant bits are used for the rest of the digital signal processing chain.

The binary output words $I_{ES}$, $I_{LS}$, $Q_{ES}$ and $Q_{LS}$, represented in the Figure by a bold line intersected by an oblique line defining 8 bits, are passed into a code loop discriminator 32 and into a code loop filter 33. The code loop discriminator performs the operations of calculating the energy of signals $I_{ES}$, $I_{LS}$, $Q_{ES}$ and $Q_{LS}$. An accumulation of values during a certain number N of integration cycles, for example 16 cycles, is achieved in the code discriminator.

In the present invention, the discriminator is non-coherent and of the delay lock loop type (DLL). In this discriminator, a subtraction can be performed between the early signal amplitude square values and the late signal amplitude square values. However, any type of discriminator can be used provided the early signal amplitude values are kept substantially equal to the late signal amplitude values. The reader may also refer to chapter 8 entitled "GPS Receivers" by A. J. Van Dierendonck of the book "Global Positioning System and Applications" published by the American Institute of Aeronautics and Astronautics in 1996.

On this discriminator, a correction is brought from the carrier loop, since during transmission of the signal by the satellite, the Doppler effect is felt not only on the carrier frequency, but also on the PRN code, which is modulated on the carrier frequency. Bringing the carrier into the code loop discriminator corresponds to dividing the carrier shift increment by 1540.

Depending on the filtered result of the discriminator, a phase increment is imposed by the 28-bit NCO oscillator on PRN code generator 35 so that it transmits the PRN code bit series to register 36 to make a new correlation. The frequency resolution of this 28-bit NCO is of the order of 16 mHz (for a clock frequency of 4.36 MHz).

The controller processes the various results of the loop so that it can coordinate the acquisition and tracking operations. Once there is synchronisation and locking onto the desired satellite, the values $I_{ES}$ and $I_{LS}$ are introduced into a demodulation unit 50 capable of providing the data message at 50 Hz over 1 bit via the data input and output register to the microprocessor means. In addition to the message, the microprocessor means can take, in particular, the information concerning the pseudo-ranges introduced in the buffer register in order to calculate the X, Y and Z position, velocity and precise local time.

None of the elements explained hereinbefore will be described in detail, given that they form part of the general knowledge of those skilled in the art in this technical field.

The sum of signals $I_{ES}$ and $I_{LS}$ in adder 37 is used to create signal $I_{PS}$ and the sum of signals $Q_{ES}$ and $Q_{LS}$ in adder 38 is used to create signal $Q_{PS}$, both signals $I_{PS}$ and $Q_{PS}$ being represented by 8 bits. These binary words are introduced at a frequency of 1 kHz into a carrier loop discriminator 42 (envelope detection) to calculate the energy of the signals followed by a carrier loop filter 43. The discriminator is formed in particular of an 8-bit multiplier and a 20-bit accumulator. It is of the frequency and phase lock loop type.

A mean value operation is performed in the frequency discriminator in order to increase the reliability and precision of the carrier tracking loops. The accumulation provided in the discriminator lasts for a number N of cycles, for example 16 cycles, which corresponds to 16 ms. The microprocessor means also impose signals STC on discriminator 42 for the unused channels placed in parallel to the selected channels.

Depending on the result of the discriminator and after passage through the filter, the 24-bit NCO oscillator of carrier 44 receives a frequency increment (bin) for correcting the carrier frequency replica. This 24-bit NCO has a frequency resolution of the order of 260 mHz.

The two control or enslaving methods of code and carrier are synchronised during tracking, although the carrier tracking loops are only updated after confirmation of the presence of the satellite signal.

It should be known that during transmission of the radio-frequency signals by a satellite, the Doppler effect has an influence on said signals both on the carrier frequency and on the PRN code, which means that the code and carrier control loops are connected to each other to obtain better adjustment precision of the PRN code phase and carrier frequency received at the receiver.

At each correlation epoch in search phase, the PRN code replica phase is delayed in time, for example by steps of 1 chip in order to find the satellite phase shift. Once the satellite has been found in tracking phase, the code adjustment occurs for example with steps of 0.05 to 0.1 chips. Moreover, the carrier frequency including the Doppler effect has to be corrected which occurs in a carrier control loop. In addition to the Doppler effect, account must also be taken of the lack of precision of the internal oscillator and the ionosphere effects. These errors, corrected in the code and carrier loops correspond to a frequency shift of ±7.5 kHz.

All of the synchronisation tasks are executed in each operating channel when no multipath signals have been detected. If the microprocessor means detect the effects of multipath signals in a first operating channel, a second unused channel is connected in parallel to the first channel so as to find the maximum amplitude of the auto-correlation function. In this case, the code and carrier control loops of said channel can no longer be used, since, with this second unused channel, amplitude value equivalence of the auto-correlation function of the early and late signals in tracking mode no longer has to be obtained.

This unused channel has to be looped with the microprocessor means for the phase shifting operations of one of the early or late replicas in order to find the maximum amplitude value of the auto-correlation function between the two amplitude values of the first channel. In order to do this, two interruption elements 45 and 47 are placed in each control loop of all the channels. When the microprocessor means detect the presence of multipath signals in the first channel, the second unused channel receives an instruction Sc from said means in order to interrupt the two control loops.

Figure 4A:
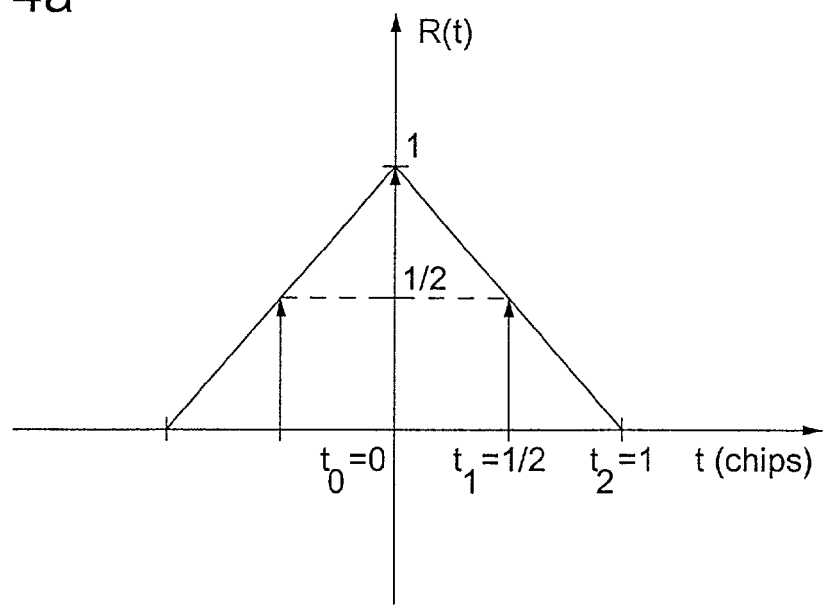
Figure 4B:
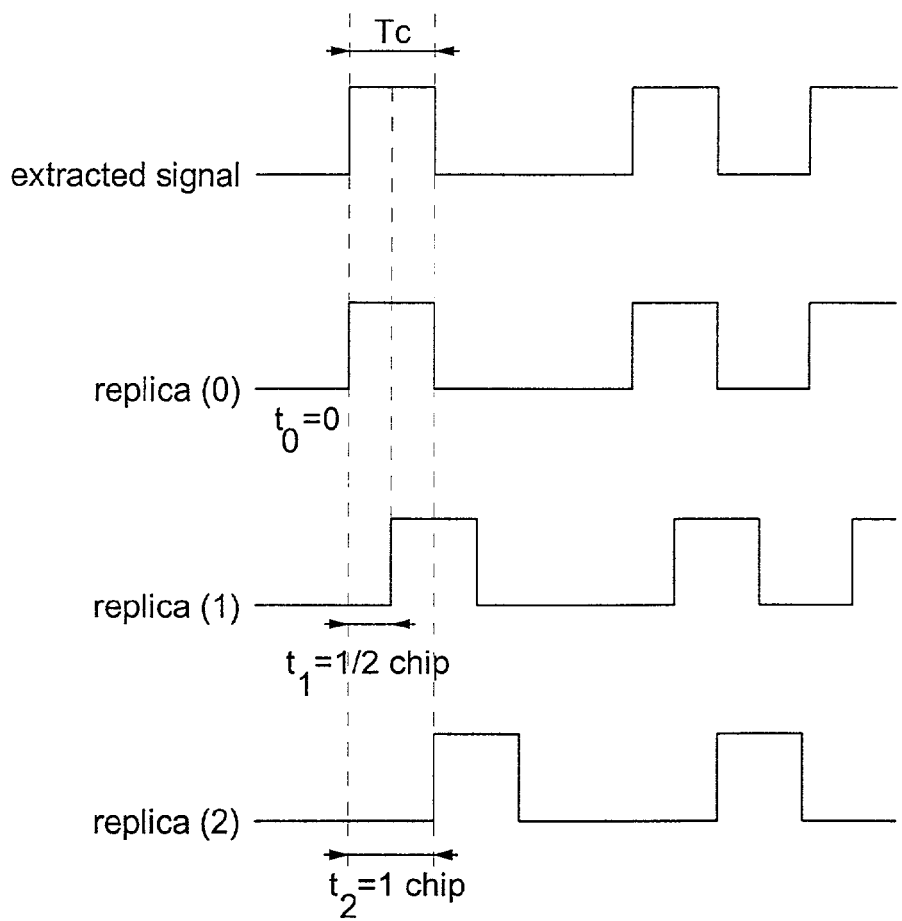

FIGS. 4a and 4b shows on the one hand, an auto-correlation function and, on the other hand, specific code intermediate signals to be correlated with the replicas of said code.

The auto-correlation function, of FIG. 4a, shows the result of the correlation of two identical rectangular pulse logic signals, but phase shifted with respect to each other. Said correlated logic signals are on the one hand, the pseudo-random code intermediate signals and, on the other hand, a replica of said pseudo-random code generated in the receiver channels. The general formula for the auto-correlation function is as follows:

$$R(t) = \int f(\tau) f(t+\tau) d\tau$$

Where $f(\tau)$ equals A, which is the amplitude of the rectangular-shaped signals to be correlated, for $\tau$ in absolute value smaller than or equal to $T_c/2$ and 0 otherwise. $T_c$ represents 1 chip which corresponds to 977.5 ns since the pseudo-random code frequency is 1,023 MHz. As the signals are rectangular signals, this function R(t) is thus defined solely by the following formula:

$$R(t) = A^2 T_c (1 - |t|/T_c) \text{ for } |t| \leq T_c, R(t) = 0 \text{ elsewhere}$$

In a case without any disruption by the effects of multipath signals, the shape of the auto-correlation function is triangular with a slope in absolute value equal on each side of the vertex or summit of said function. Signal amplitude A has a value 1 which means that the amplitude value, defined as being standardised, has a value 1 at the vertex of said function when the signals to be correlated are perfectly in phase.

In FIG. 4b, the replica (0), of phase shift t=0, is perfectly in phase with the extracted signal (intermediate signals), which gives a maximum amplitude value equal to 1. The replica (1), of phase shift t=½ chip with respect to the extracted signal, gives an amplitude value equal to ½. Finally, the replica (2), of phase shift t=1 chip with respect to the extracted signal gives an amplitude value equal to 0.

Figure 5A:
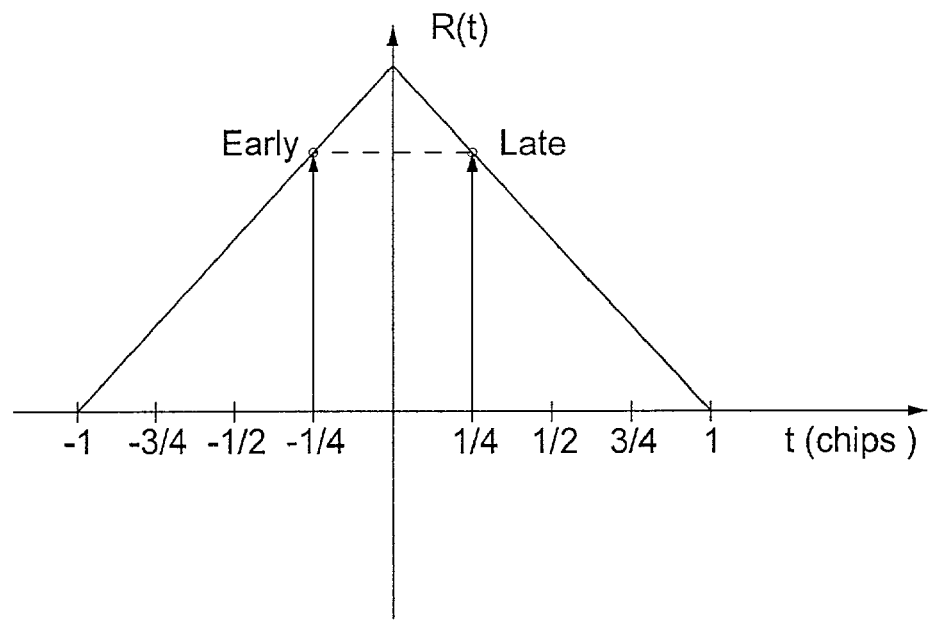
FIG. 5a shows a graph of the auto-correlation function, the amplitude of the signals correlated with the early replica being equal to the amplitude of the signals correlated with the late replica in a tracking phase.

The GPS receiver of the present invention generates two early and late pseudo-random code replicas each to be correlated with the intermediate signals. The phase shift between the two replicas is ½ chip. FIG. 5a shows an auto-correlation function where the amplitude values of the correlated early and late signals are represented in a visible satellite tracking mode. The early amplitude value adjusted in tracking mode is offset by −¼ chip from the vertex of the auto-correlation function, and the late amplitude value adjusted in tracking mode is offset by ¼ chip from the vertex of said function.

In normal operation, the amplitude values of the early and late signals of the operating channel are thus equal in the visible satellite tracking mode. These amplitude values are thus never at the auto-correlation function maximum. The code discriminator performs a subtraction of the amplitude values of the early signals and late signals at each integration period. Via this subtraction, the code discriminator can thus supply a more precise code correction increment.

Figure 5B:
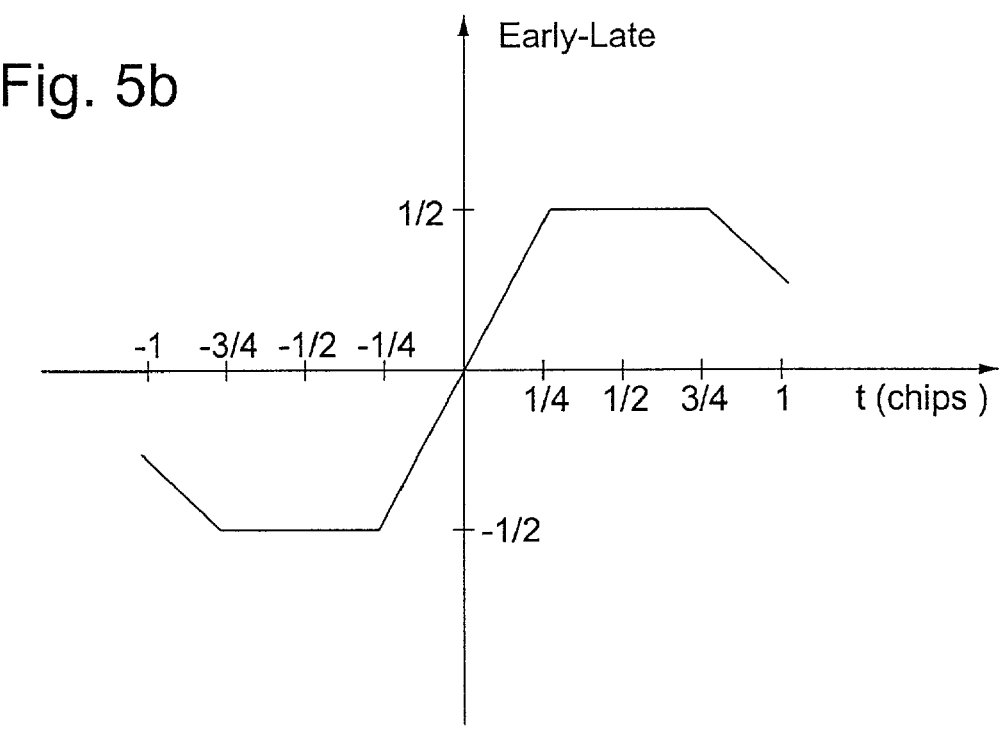
FIG. 5b shows a graph of the auto-correlation function obtained by subtracting the early component and the late component.

When the amplitude values are equal, the result of the subtraction in the discriminator gives a zero value which is required in order to get into tracking mode. The correlation function of the difference in these amplitude values in the discriminator is shown in FIG. 5b.

It should be noted that the auto-correlation function shown in FIG. 5a does not have an ideal triangular shape, as 2 MHz bandpass filtering is carried out in the receiving and shaping means, which removes several lobes from the power spectrum. The auto-correlation function thus has a rounded portion at its summit and not a peak.

When radio-frequency signals are diverted by obstacles on their path, the signals picked up by the receiver are multipath signals. These signals are added to the radio-frequency signals originating directly from the tracked transmitting satellite. These effects disrupt the calculation of the receiver's position if one of the channels is in tracking mode for such a satellite.

FIG. 6a shows two auto-correlation functions for direct signals picked up by the receiver and multipath signals. As will be generally observed, the auto-correlation function of the multipath signals is offset towards the right of the auto-correlation function of the direct signals. Moreover, the maximum amplitude value of the multipath signal auto-correlation function of less than that of the direct signal auto-correlation function.

In FIG. 6a, the multipath auto-correlation function is of the constructive type, i.e. the maximum amplitude value is positive. It is also possible for the multipath signals to lead to an auto-correlation function whose maximum amplitude value is negative. In such case, the signals are called destructive multipath signals.

FIG. 6b shows a resulting auto-correlation function obtained at the output of the receiver's integration means when multipath signals are present. This resulting function is the addition of the two auto-correlation functions shown in FIG. 6a.

One channel, set into operation to search and track a satellite whose signals are diverted from their trajectory, has equal auto-correlation function amplitude values for the early correlated signals E1 and late correlated signals L1, but a phase shift A with respect to the vertex of said function. In the case of constructive multipath signals, the two equal amplitude values in tracking mode are greater than the amplitude values of an operating channel which is not influenced by such multipath signals. Since the vertex P1 of the auto-correlation function is generally at an equal phase shift between the two early and late replicas, the multipath signals create a phase error represented by shift Δ.

In FIG. 6b, this shift Δ is approximately ⅛ chip, which corresponds to an error of 35 m on the position calculated by the microprocessor means.

FIG. 6c shows the auto-correlation function of the subtraction E1−L1 of the amplitude values of the early and late signals obtained in the code discriminator with the influence of multipath signals.

In order to understand how the receiver acts to correct the influence of the multipath signals, reference will be made to FIG. 7 which shows a flow diagram of the steps of the method for activating the receiver or setting the latter into operation. It should be noted that the microprocessor means should normally configure at least four channels for tracking four visible satellites in order to calculate the position of the receiver. However, for the sake of simplification, the steps of the method are only described with reference to FIG. 7 for one selected channel.

At step 100, a first channel is selected by the microprocessor means to search and track a visible satellite. The first channel searches the visible satellite while correcting the carrier and code replicas to be correlated with the intermediate signals in the carrier and code control loops.

During this search phase, a check of the amplitude values of the auto-correlation function of the early and late signals at the output of the integration means is performed at step 101. If the amplitude values are not equal, a phase shift of the pseudo-random PRN code occurs at step 102. In theory, in search phase, the code replica is shifted by one chip.

During all the search phases of said satellite, the amplitude values at the output of the integration means are stored, as well as the corresponding phase shifts.

As soon as the amplitude values E1 and L1 of the first channel are equal, the calculation of the slopes at points E1 and L1 is performed by the microprocessor means, during a step 103. A comparison of the calculated slopes is made at step 104. If slopes $P_{E1}$ and $P_{L1}$ are substantially equal in absolute value, the first channel is not influenced by multipath signals. This first channel, aligned at step 105, can thus provide precise data to the microprocessor means for calculating, in particular, the X, Y and Z position.

Even if the microprocessor means have not detected the presence of multipath signals in the first channel, it is nonetheless possible for multipath signals to appear when said receiver moves. In order to ensure that the first channel is not influenced, in tracking mode, by said multipath signals, a check of the auto-correlation function amplitude value of the early and late signals is also performed.

As long as no variation in amplitude E1 is observed at step 106, the first channel still provides precise data to the microprocessor means without any multipath signal effect. Conversely, if a variation in amplitude E1 appears, the microprocessor means configure and switch on a second unused channel at step 107 which is set into operation in parallel to the first channel. The second channel is also switched on if, at step 104, the slopes calculated in absolute value for the first channel are substantially different.

The second channel is configured using parameters of the first channel stored via the microprocessor means. This allows an in-phase guiding of the code replica of the second channel for quickly searching maximum amplitude value E2 at step 108. This maximum amplitude value E2 is between the two amplitude values E1 and L1 in the first channel tracking mode. Since the second channel has to find this maximum amplitude value either with the early code replica or with the late code replica, the control loops of the second channel cannot be directly used. Consequently, the microprocessor means are responsible for enslaving the second channel to find the vertex of the auto-correlation function by a linear regression method or by a Newson-Raphson type optimisation algorithm. An instruction is thus imposed on the two interruption elements of the second channel to disconnect its control loops.

As long as amplitude value E2 is not maximum, a code phase shift of one of the code replicas of the second channel is performed at step 109. During all these search operations for the maximum amplitude value, all the amplitude values E2 of the second channel between the two amplitude values E1 and L1 are stored, as well as the corresponding phase shifts.

When the maximum amplitude value E2 has been found at step 108, a calculation of the slopes on each side of the vertex of the auto-correlation function is performed at step 110, using stored amplitude values. If slopes $P_{2AV}$ and $P_{2AP}$ are substantially different in absolute value, it is only the second channel aligned on the maximum amplitude value at step 113 which provides the precise data to the microprocessor means in particular, for the position calculation. A continual check of the amplitude value of the second channel is carried out.

If slopes $P_{2AV}$ and $P_{2AP}$ are substantially equal in absolute value, this means that the multipath signals are not present. In this case, the second channel can be stopped at step 112. Thus, the microprocessor means can again take the precise data from the first channel since the latter was not stopped when the first channel was switched on.

As the receiver which has just been described is intended to be fitted to a portable object of reduced size, such as a wristwatch or a mobile telephone, a single unused channel is preferably switched on in parallel to one of the operating channels when the microprocessor means have detected the presence of multipath signals in said operating channel. As indicated hereinbefore, one need only select at least four channels initially for each tracking a specific visible satellite.

Normally, the second channel is only switched on in visible satellite tracking mode by the first channel. However, since the parameters of each channel, and phase shifts, are stored in storage means, the second channel can be switched on in parallel to the first channel even when the latter is in search phase. The microprocessor means know whether the operating channels are capable of being influenced by multipath signals.

From the description which has just been given, multiple variants of the receiver, particularly of the GPS type, can be conceived by those skilled in the art, without departing from the scope of the invention defined by the claims.

What is claimed is:

1. A receiver for radio-frequency signals modulated by specific codes of transmitting sources, in particular of the GPS type, said receiver including:
   receiving and shaping means with frequency conversion of the radio-frequency signals for generating intermediate signals,
   a correlation stage formed of several correlation channels for receiving the intermediate signals, each channel being provided with a correlator in which the intermediate signals are correlated, in at least one control loop of the correlator when the channel is being used, with at least two early and late replicas of the specific code of a visible transmitting source to be searched and tracked, the correlator including integration means for the correlated signals, to provide, at the end of each integration period, a first amplitude value of the auto-correlation function of the early signals and a second amplitude value of the auto-correlation function of the late signals, in a tracking mode of the transmitting source the first and second amplitude values being kept substantially equal,
   microprocessor means connected to the correlation stage for processing the data extracted, after correlation, from the radio-frequency signals,
   wherein at least a second unused channel is configured with parameters from at least a first operating channel via the microprocessor means to be placed in parallel to a said first operating channel for searching and/or tracking the same visible transmitting source, when the microprocessor means have detected the presence of multipath radio-frequency signals in the first operating channel, the microprocessor means enslaving the second channel for generating a specific code replica to be correlated with the intermediate signals so that the integration means of the second channel provide a maximum amplitude value for the auto-correlation function between the first and second amplitude values of the auto-correlation function of the first channel.

2. The receiver according to claim 1, wherein several amplitude values of the auto-correlation function provided by the integration means concerning at least the first operating channel, and corresponding phase shifts, are stored in storage means in search and/or tracking phase of a visible transmitting source to enable the microprocessor means to calculate a first slope of the auto-correlation function at the point of the first amplitude value of the early signals and a second slope of the auto-correlation function at the point of the second amplitude value of the late signals, when the first and second amplitude values are equal, said microprocessor means detecting the presence of multipath radio-frequency signals in the first channel when the first and second slopes are substantially different in a tracking mode.

3. The receiver according to claim 1, wherein the second unused channel is configured and placed in parallel to the first operating channel when the microprocessor means have detected an amplitude variation in the auto-correlation function of the early and/or late correlated signals in a visible transmitting source tracking mode.

4. The receiver according to claim 1 for receiving radio-frequency signals transmitted by satellites, wherein the correlation stage includes a higher number of correlation channels than the number of visible satellites so that at least a second unused channel can be switched on in parallel to a first operating channel for searching and/or tracking the same visible transmitting source.

5. The receiver according to claim 4, wherein the number of channels is higher than or equal to 12.

6. The receiver according to claim 1, wherein several second unused channels are configured to be switched on each in parallel to one of the first operating channels, when the microprocessor means have detected the presence of multipath signals in each of the first channels.

7. The receiver according to claim 1 for receiving radio-frequency signals transmitted by satellites, wherein the integration period of the integration means of first operating channels each in visible satellite searching and/or tracking phase is equivalent to the repetition period of the specific code of the transmitting satellites.

8. The receiver according to claim 1, wherein a set of data input and output registers is placed as an interface between the correlation stage and the microprocessor means in order to receive data transmitted by the microprocessor to the correlation stage and data provided by the correlation stage for the microprocessor.

9. The receiver according to claim 2, wherein each channel includes storage means for the amplitude values of the auto-correlation function and the corresponding phase shifts.

10. The receiver according to claim 2, wherein the storage means form part of the microprocessor means.

11. The receiver according to claim 1, wherein, in each channel, a controller, including a digital signal processing algorithm, is associated with the correlator to allow all the synchronisation tasks for searching and tracking a satellite to be performed autonomously independently of the microprocessor means, when the channel is set into operation normally.

12. The receiver according to claim 1 for receiving radio-frequency signals with carrier frequency transmitted by satellites, wherein each channel receives complex intermediate signals formed of an in-phase signal component and a quadrature phase signal component, wherein each correlator of the channels includes:
first mixers for correlating the in-phase signal component with a first carrier frequency replica and for correlating the quadrature phase signal component with a second carrier frequency replica offset by 90° with respect to the first carrier frequency replica;
second mixers for correlating the output in-phase signal of the first mixers with a first early specific code replica and with a second late specific code replica and for correlating the quadrature phase output signal of the first mixers with the first early replica and the second late replica,
and wherein four integrator counters of the integration means per operating channel receive the correlated output signals from the second mixers in order to provide four amplitude values of the auto-correlation function.

13. The receiver according to claim 1, wherein the early signals have a phase shift of a half-chip with respect to the late signals.

14. The receiver according to claim 12, wherein each correlator of the channels, after the integrator counters, includes, in the code control loop, a code loop discriminator, the code discriminator performing a subtraction of each amplitude value of the auto-correlation function of the early and late signals, so as to provide a code correction increment for the code replicas over a discriminator period which is N times greater than the integration period, N being an integer number, a code loop filter, a first numerical controlled oscillator a code generator connected to a 2-bit register delivering the early and late replicas of the specific code of a transmitting source to the second multiplier stage, and, in a carrier control loop, a carrier loop discriminator, a carrier loop filter, a second numerical controlled oscillator, and a block for providing to the first multiplier stage of the first and second replicas of the carrier frequency, loop interruption elements controlled by the microprocessor means being placed in each control loop so as to enslave a second unused channel placed in parallel to a first operating channel when an interruption instruction is imposed on said elements of the second channel.

15. A method for correcting the effects of multipath signals in a receiver for radio-frequency signals modulated by specific codes of transmitting sources, said receiver including:
receiving and shaping means with frequency conversion of the radio-frequency signals for generating intermediate signals,
a correlation stage formed of several correlation channels for receiving the intermediate signals, each channel being provided with a correlator in which the intermediate signals are correlated, in at least one control loop of the correlator when the channel is being used, with at least two early and late replicas of the specific code of a visible transmitting source to be searched and tracked, the correlator including integration means for the correlated signals, to provide, at the end of each integration period, a first amplitude correlation value of the early signals and a second amplitude correlation value of the late signals,
microprocessor means connected to the correlation stage for processing the data extracted, after correlation, from the radio-frequency signals, the method including a first series of steps of:
configuring and switching on a certain number of first channels so that each channel searches and tracks a specific transmitting source,
phase shifting the early and late replicas of the specific code of each operating channel to be correlated with the intermediate signals until the first and second amplitude values for the auto-correlation function are equal,
storing correlation amplitude values for the early signals and late signals, and for corresponding phase shifts, during the search and/or tracking phase,
wherein said method further includes a second series of steps of:
calculating, using the auto-correlation function amplitude values and corresponding phase shifts stored in search and/or tracking phase for each first operating channel, a first slope of the auto-correlation function at the point of the first amplitude value of the early signals and second slope for the auto-correlation function at the point of the second amplitude value of the late signals, when the channel is in the transmitting source tracking mode,
configuring and switching on at least a second unused channel with parameters from at least a first operating channel to be placed in parallel to said first operating channel, if the two slopes calculated are, in absolute value, substantially different, or if a variation is observed in the first amplitude value of the early signals or in the second amplitude value of the late signals in a tracking mode,
phase shifting one of the code replicas of the second channel under an instruction from the microprocessor means until the integration means of the second channel supply a maximum amplitude value of the auto-correlation function between the first and second amplitude values of the auto-correlation function of the first channel so that the microprocessor means can extract the data from the radio-frequency signals of this second channel while correcting the effects of multipath signals.

16. The method according to claim 15, wherein amplitude values of the auto-correlation function of the second channel, and corresponding phase shifts, are stored until the maximum amplitude value is supplied by the integration means of the second channel.

17. The method according to claim 16, wherein the microprocessor means calculate the amplitude variation slopes of the auto-correlation function before and after the maximum amplitude value of the second channel, and wherein the second channel is stopped if the slopes are substantially equal in absolute value, the microprocessor means being able to extract the data from the radio-frequency signals of the first channel.

18. A receiver for radio-frequency signals modulated by specific codes of transmitting sources, in particular of the GPS type, said receiver including:
receiving and shaping means with frequency conversion of the radio-frequency signals for generating intermediate signals,
a correlation stage formed of several correlation channels for receiving the intermediate signals, each channel being provided with a correlator in which the intermediate signals are correlated, in at least one control loop of the correlator when the channel is being used, with at least two early and late replicas of the specific code of a visible transmitting source to be searched and tracked, the correlator including integration means for the correlated signals, to provide, at the end of each integration period, a first amplitude value of the auto-correlation function of the early signals and a second amplitude value of the auto-correlation function of the late signals, in a tracking mode of the transmitting source the first and second amplitude values being kept substantially equal,
microprocessor means connected to the correlation stage for processing the data extracted, after correlation, from the radio-frequency signals,
wherein at least a second unused channel is configured with parameters from at least a first operating channel via the microprocessor means to be placed in parallel to said first operating channel for searching and/or tracking the same visible transmitting source, when the microprocessor means have detected the presence of multipath radio-frequency signals in the first operating channel, the microprocessor means enslaving the second channel for generating a specific code replica to be correlated with the intermediate signals so that the integration means of the second channel provide a maximum amplitude value for the auto-correlation function between the first and second amplitude values of the auto-correlation function of the first channel,
wherein each correlator of the channels, after integrator counters of integration means, includes, in the code control loop, a code loop discriminator, the code discriminator performing a subtraction of each amplitude value of the auto-correlation function of the early and late signals, so as to provide a code correction increment for the code replicas over a discriminator period which is N times greater than the integration period, N being an integer number, a code loop filter, a first numerical controlled oscillator a code generator connected to a register delivering the early and late replicas of the specific code of a transmitting source to a second multiplier stage.

19. The receiver according to claim 18, for receiving radio-frequency signals with carrier frequency transmitted by satellites, wherein each channel receives complex intermediate signals formed of an in-phase signal component and a quadrature phase signal component,
wherein each correlator of the channels includes:
first mixers for correlating the in-phase signal component with a first carrier frequency replica and for correlating the quadrature phase signal component with a second carrier frequency replica offset by 90° with respect to the first carrier frequency replica;
second mixers for correlating the output in-phase signal of the first mixers with a first early specific code replica and with a second late specific code replica and for correlating the quadrature phase output signal of the first mixers with the first early replica and the second late replica,
wherein four integrator counters of the integration means per operating channel receive the correlated output signals from the second mixers in order to provide four amplitude values of the auto-correlation function, and
wherein each correlator includes, in a carrier control loop, a carrier loop discriminator, a carrier loop filter, a second numerical controlled oscillator, and a block for providing to the first multiplier stage of the first and second replicas of the carrier frequency, loop interruption elements controlled by the microprocessor means being placed in each control loop so as to enslave a second unused channel placed in parallel to a first operating channel when an interruption instruction is imposed on said elements of the second channel.

* * * * *